July 21, 1959 — H. L. DUNLAP — 2,895,430
FREIGHT SECURING MEANS
Filed Dec. 20, 1954

INVENTOR.
Henry L. Dunlap
BY Harness, Dickey & Pierce
ATTORNEYS.

United States Patent Office 2,895,430
Patented July 21, 1959

2,895,430

FREIGHT SECURING MEANS

Henry L. Dunlap, Dearborn, Mich., assignor to Evans Products Company, Plymouth, Mich., a corporation of Delaware Application December 20, 1954, Serial No. 476,336

2 Claims. (Cl. 105—369)

The present invention relates generally to freight securing means and more particularly to cable, chain, rope or rod end fittings for anchoring the latter to a permanently-installed freight loading system including deck, overhang or side members having a pattern of holes in their exposed surfaces.

In a copending application of Harvey W. Chapman and Henry L. Dunlap, Serial No. 457,474, filed September 21, 1954, now U.S. Patent 2,834,304, granted May 13, 1958, there is disclosed a freight loading system wherein structural members are affixed to two opposed surfaces enclosing a freight storage area, for example, structural members affixed to the deck of a ship and to the overhang above the deck. These structural members have an aligned grid pattern of holes in their exposed surfaces which are utilized to erect and secure freight bracing members, auxiliary deck members, chocks, wedges, and other permanent dunnage members. With such a system, it is sometimes desirable to brace or secure the freight to the deck or to the bracing members by means of cables, chains, ropes, etc. The bracing members themselves have holes which have the same spacing as the deck and overhang members. It would be desirable to provide self-anchoring or self-locking fittings for cables, etc., so that the latter could be easily, quickly and securely installed and removed.

It is a principal object of this invention, therefore, to provide self-anchoring end fittings for cables, chains, ropes, lines, rods, etc., which fittings are adapted to be inserted in a hole and expanded therein to anchor itself.

Another object is to provide an end fitting which is adapted to expand in an anchor hole in response to a pull thereon.

Still another object is to provide an end fitting having a loop for attachment of a cable, chain, rope, etc., which loop functions as an expander element to lock the fitting in a hole.

A further object is to provide an end fitting of the type described wherein means are provided for preventing accidental disengagement between the expander element and the end fitting itself.

Other objects and advantages will be apparent, or will become apparent, in the more detailed description of the invention to follow, which description is to be taken in conjunction with the accompanying drawings, in which.

In accordance with the present invention, an end fitting is provided which comprises a pair of jaws adapted to enter a hole or separate holes and a link member having a small dimension and a large dimension for expanding the jaws to lock them in the hole or holes. The small dimension of the link member is brought between the jaws to allow them to be closed for insertion in the hole and the larger dimension is then brought between the jaws to expand them into locking position. It is preferred that the link member be so designed that it also will serve as a link to which a cable, chain, rope, rod or other fastening device is attached, the line being attached thereto in such a manner that a tension applied by the line to the link naturally causes the large dimension portion thereof to be presented to the jaws. As will be seen, the jaws and the link can have a variety of designs and shapes and that the jaws can be provided with stops and safety features preventing disengagement between link and jaws.

Figures 1, 2:
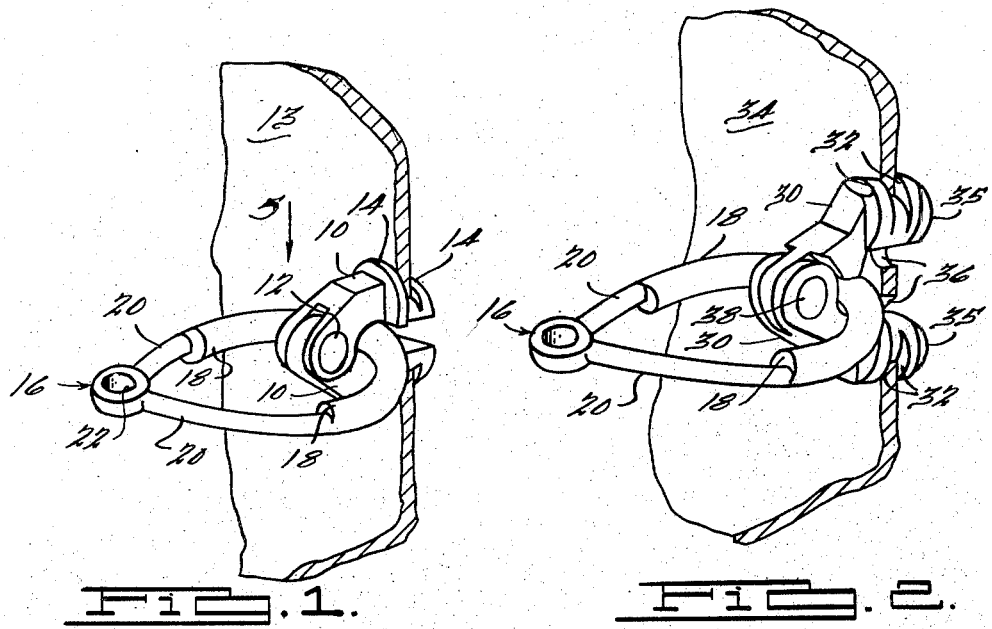
Fig. 1 is a perspective view, with portions broken away, of an end fitting of this invention adapted for anchoring in a single hole as it appears when anchored therein.
Fig. 2 is a perspective view similar to Fig. 1 but showing an end fitting of this invention which is adapted to be anchored in two adjacent holes.
Figure 5:
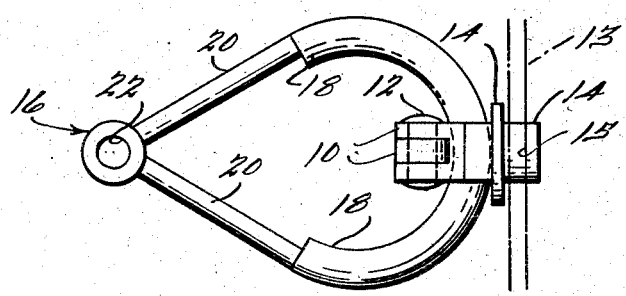
Fig. 5 is a plan view of the fitting of Fig. 1, the view being taken in the direction of the arrow 5 in Fig. 1.

As shown in Figs. 1 and 5, the fitting is provided with a pair of jaws 10 which are pivoted on a pin or rivet 12 so as to be expanded in one or more holes in a surface 13. In Fig. 1, the jaws 10 are designed to be anchored in the same hole, this being accomplished by means of a pair of parallel semi-circular ridges 14 on each jaw member 10, which ridges define a slot 15 to fit around the edge of the hole. This latter feature is most clearly shown in Fig. 5. Inserted between the jaws is a ring-like or link-like member 16 which has an enlarged portion 18 in the bottom portion of the ring and a smaller portion 20 in the upper portion. A hole 22 is provided in the upper end of the ring for securing a line, cable or chain, etc., therein. Thus, when a pull is exerted on such a line the ring-like link element 16 will align itself to bring its enlarged diameter 18 between the jaws. To remove such a fitting one has only to slack off on the line and rotate the link 16 until its smaller diameter is between the jaws, press or pinch the jaws together and remove the fitting from the hole.

Fig. 2 shows a two-hole modification wherein each of a pair of jaws 30 is provided with a pair of parallel ridges 32, similar to those of Fig. 1, which are nearly circular in shape so as to firmly engage therebetween a substantial area of the surface 34 surrounding the holes 36. The leading ends 35 of jaws 30 are tapered so as to facilitate insertion in the holes 36. As in Fig. 1, the jaws 30 are secured together by means of a rivet 38 and a ring-like link element 16 similar in design and function to that of Fig. 1 is provided. The end fitting of Fig. 2 functions in the same manner as that of Fig. 1 but has the added advantage of greater load holding power due to the use of two holes instead of one. In instances where the surface 34 is thin stock or of aluminum or other softer metal, it is sometimes desirable to use more than one hole in order to prevent distortion around the holes due to a heavy load.

Figures 3, 4:
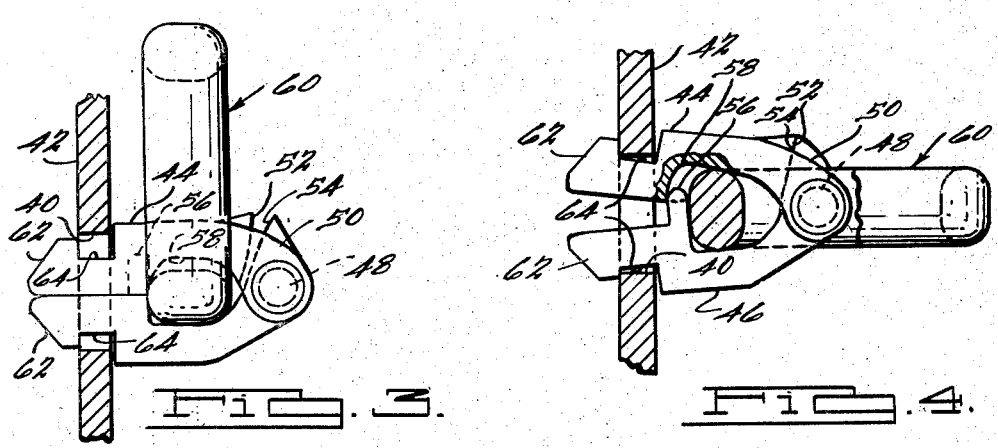
Fig. 3 is a side elevational view partially in section of another end fitting of this invention, the view showing in particular the fitting in the collapsed or unlocked position to better illustrate the stop means for limiting the separation of the jaws.
Fig. 4 is a view similar to that of Fig. 3 but showing the fitting in the locked, expanded condition.

In Fig. 3 a further modification of the end fitting of this invention is shown. As shown, the fitting is thin and made of sheet stock so as to be more easily inserted in a hole 40 in a structure 42. In this fitting, a pair of jaws 44, 46 are pivotally joined by a rivet 48 with one jaw 44 having a clevis-like fitting 50 between the sides of which is disposed the end of the knife-like jaw blade 46. The inner surface of the clevis fitting 50 is built up to form a stop surface 52 against which the inner end 54 of jaw 46 is fitted. Thus when the jaws 44, 46 are spread apart, the jaw surfaces 52, 54 come into contact to prevent further spreading movement. Jaw member 46 has an upward projection 56 which fits into a slot or cut away area 58 in the other jaw member 44 when the jaws are urged apart, the projection 56 preventing removal of the ring 60 from between the jaws.

As appears in Figs. 3 and 4, the forward edges 62 of the jaw members are tapered to facilitate entrance into the holes 40 and a notch 64 is provided to engage the edge of the hole when expanded. The ring member 60 is a circular member having a more or less oval cross section having a thick and a thin dimension. As shown in Fig. 3, the thinner dimension is presented to the jaws by rotating the ring so as to be parallel to the anchor surface 42. When the ring 60 is pulled to the horizontal position as shown in Fig. 4, the thicker dimension is presented to the jaws and the latter are spread apart so that the surface 42 is engaged by the notches 64. As before, the cable, chain, rope or other line is secured to the ring.

The end fittings of this invention are simple and inexpensive to make, they are foolproof in operation since they are self-locking and they have no complicated latching means, springs, levers, etc., to get out of order. They can be used in any position on the deck, sides or overhead and may be secured to bracing members, support columns and the like. Once properly installed, they cannot let go as long as a pull is exerted on them. Their use greatly facilitates the installation of freight holddowns and snugging braces for odd shaped, or unstable freight. By their use bins, bulkheads, tension take-ups and the like are readily erected or secured anywhere on the freight-supporting surface. These fittings, of course, can be employed in situations other than freight loading apparatus, in fact, they can be used anywhere there exists a hole or holes in an anchoring structure.

What is claimed is:

1. A fitting adapted to be inserted in hole means in a plate-like element comprising a pair of jaw elements, means pivotally connecting corresponding ends of said jaw elements, jaws on the opposite ends of said jaw elements adapted to be inserted through said hole means from one side of said plate-like element when said jaws are moved toward each other by pivotal movement of said jaw elements in one direction and adapted to engage the remote side of said plate-like element after being so inserted through said hole means when said jaws are moved away from each other by pivotal movement of said jaw elements in the opposite direction, said jaw elements having opposed surfaces disposed at said one side of said plate-like element when said jaws engage said remote side of said element and defining an opening therebetween, and a loop extending through said opening and pivotally movable between a first position in which it is disposed substantially parallel to said plate-like element and a second position in which it is disposed at right angles to said element, said loop including a portion having an oblong cross section adapted to fit within said opening when said loop is in said first position and said jaw elements have been pivoted in said one direction so that said jaws may be moved through said hole means and said oblong cross section of said portion being effective upon only pivotal movement of said loop from said first position to said second position to pivot said jaw elements in said opposite direction to move said jaws apart for engaging the remote side of said plate-like element.

2. A fitting as defined in claim 1, wherein said loop is of uniform cross section at all points.

References Cited in the file of this patent

UNITED STATES PATENTS

| | | |
|---|---|---|
| 206,226 | Butler | July 23, 1878 |
| 314,243 | Heathcote | Mar. 24, 1885 |
| 503,627 | Travis | Aug. 22, 1893 |
| 560,329 | Sherman | May 19, 1896 |
| 813,384 | Kiefer | Feb. 20, 1906 |
| 1,018,731 | Tscherning | Feb. 27, 1912 |
| 2,121,572 | Polden | June 21, 1938 |
| 2,422,693 | McArthur | June 24, 1947 |
| 2,514,692 | Carson | July 11, 1950 |
| 2,614,871 | Grizzard | Oct. 21, 1952 |